United States Patent [19]

Speronello

[11] 4,193,954

[45] Mar. 18, 1980

[54] BETA ALUMINA MANUFACTURE

[75] Inventor: Barry K. Speronello, Saddle Brook, N.J.

[73] Assignee: Engelhard Minerals & Chemicals Corporation, Menlo Park, N.J.

[21] Appl. No.: 890,797

[22] Filed: Mar. 27, 1978

[51] Int. Cl.$^2$ ............................................. C04B 35/10
[52] U.S. Cl. ........................................ 264/13; 106/65; 264/66; 429/191; 429/192
[58] Field of Search ............... 264/61, 66, 13; 106/65; 423/600; 429/191, 193

[56] References Cited

U.S. PATENT DOCUMENTS

| | | | |
|---|---|---|---|
| 3,795,723 | 3/1974 | Clendenen | 423/600 |
| 3,959,022 | 5/1976 | DeJonghe et al. | 264/66 |
| 4,052,538 | 10/1977 | Eddy et al. | 423/600 |
| 4,083,919 | 4/1978 | Pearlmon | 429/191 |

*Primary Examiner*—Robert F. White
*Assistant Examiner*—John A. Parrish
*Attorney, Agent, or Firm*—Inez L. Moselle

[57] ABSTRACT

Anhydrous alumina powder, preferably powdered alpha-alumina, is formed into a high solids slurry in water containing one or more soluble compounds that yield $Na_2O$ when heated in air, preferably a mixture of sodium carbonate and sodium nitrate, and optionally containing one or more soluble compounds that will yield lithium oxide, magnesium oxide or mixtures thereof, when heated in air. The slurry is rapidly dried, preferably by spraying in air, to precipitate the metal oxide precursor(s) and form an intimate substantially homogeneous mixture with the anhydrous alumina particles. This precursor powder is pressed into a shaped article, and heated to decompose the source(s) of metal oxide, react the components to form the desired beta-alumina phase, and sinter the article to produce the dense polycrystalline beta-alumina.

17 Claims, No Drawings

BETA ALUMINA MANUFACTURE

BACKGROUND OF THE INVENTION

1. Field of the Invention

This invention relates to the formation of sintered polycrystalline beta alumina ceramic articles and to high density precursors thereof. More particularly, the invention relates to a practical method for forming such articles.

2. Prior Art

Molten sodium batteries, such as sodium-sulfur and sodium-antimony trichloride batteries, were developed more than a decade ago, and have promise for future widespread use in load leveling energy storage networks. Technical problems must be overcome, however, before commercial molten sodium batteries can be marketed. Among the most critical problems awaiting solution is the invention and development of technically adequate electrolyte membranes at an acceptable price.

A number of solid electrolyte phases have been tested for use an electrolytes and separators in molten sodium batteries. Among these are beta-alumina (U.S. Pat. No. 3,404,035 to Kummer et al) and beta"-alumina U.S. Pat. No. 3,475,225 to Tennenhouse et al). The term "beta alumina," as used herein, encompasses beta and beta" aluminas or mixtures thereof unless otherwise specified. Basis for the possible utility of beta alumina as the solid electrolyte for molten sodium batteries is the fact that beta aluminas are resistant to alkali attack and they are fast ion conductors in the interlayer plane directions. The solid electrolytes, used in the form of membranes, must possess high electronic resistivity along with low ionic resistivity. The ionic resistivity of mixtures of beta and beta" aluminas has been shown in decrease continuously as the fraction of beta" alumina increases. Consequently beta" alumina is generally the preferred phase.

Beta alumina membranes must also be rigid, dense and strong enough to contain the reactants during repeated electrochemical, mechanical and possibly thermal cycling in molten sodium and sodium polysulfide or antimony trichloride environments. In addition to meeting these technical requirements beta alumina electrolytes must be available at a price commensurate with an economical battery system. Therefore the membrane must be easily mass produced and possess a reasonably long shelf life.

Early in the development of molten sodium batteries certain but not all of these requirements were met. In accordance with the teachings of U.S. Pat. No. 3,404,035 (supra), crushed beta alumina refractory brick was employed to produce structures with desired high density (thus absence of open porosity). The structure also possessed desirably low sodium resistivities at 300° C. of less than 30 ohm-cm. Shortly thereafter Tennenhouse et al (U.S. Pat. No. 3,475,225 supra) produced a lithium doped beta" alumina phase with a sodium resistivity at 300° C. of less than 5 ohm-cm. Comparable low resistivity was achieved with a magnesium doped beta" alumina (U.S. Pat. No. 3,488,271 to Kummer et al and U.S. Pat. No. 3,719,531 to Dzieiuch et al).

Prior art methods for making polycrystalline beta alumina articles are generally characterized by the fact that initially a uniform mixture of sources of oxides of sodium and aluminum, and optionally oxides of lithium or magnesium, are uniformly mixed, using dry or wet milling. When wet mixing is employed the mixtures must be dried. The mixtures are then calcined to decompose the raw material and convert the reactants to beta alumina. The calcined beta alumina is then milled, using wet or dry milling, to place it in desired fine particle size form. To convert the beta alumina powder into formed articles useful as membranes for battery systems, the powder must undergo a series of steps including pressing and sintering. Generally one or more organic processing aids must be incorporated with the powdered beta alumina before any of these steps is carried out. In most cases a processing aid is incorporated with previously milled beta alumina powder by slurrying the powder with the organic processing aid in an organic vehicle which dissolves the processing aid and then removing the volatile vehicle. The resulting powder is then pressed, typically by isostatic pressing, into an article of desired shape, such as a thin-walled tube. Typically pressures $\geq 40$ Kpsi must be used in order to produce finished articles of desired high density. The pressed shapes must then be heated to eliminate the organics and sinter the powder into dense polycrystalline beta alumina, which preferably has a density as close to the theoretical value of 3.26 g./cc. as possible.

There are several drawbacks to methods of this general description. In the first place, they are costly and complicated. For example, two to three milling operations, at least one and often two calcination steps, and up to three drying operations are required to prepare a suitable homogeneous powder. The organic pressing aids that can cause undesirably large pores after burnout and they also add to processing cost. Further, extremely high pressures ($\geq 40$ Kpsi) are required, as mentioned above. The best automatic commercial presses, however, are designed to operate at only $\geq 30$ Kpsi and therefore such presses cannot be used to produce beta alumina membranes. Those knowledgeable in ceramic technology will readily appreciate the fact that the cost of pressing would be reduced significantly if lower pressures, for example 10 to 20 Kpsi, could be used. However, it has not been possible to employ such low pressures in the practice of known technology in spite of the fact that improvements in the manufacture of beta alumina electrolytes have been sought by a considerable number of dedicated researchers having access to sophisticated processing and testing facilities.

Spray drying has been introduced to the ceramics industry to replace older techniques for preparing granules which are subsequently pressed into bodies and fired. Typically organic binders are incorporated with a ceramic slip prior to a spray drying operation which replaces a multiplicity of steps required in the practice of more conventional ceramic processing technology. It has been proposed to utilize spray drying as a step in the production of beta alumina ceramic articles. One proposed technique for producing sintered polycrystalline beta alumina articles involves spray drying alpha alumina, an anhydrous relatively inexpensive source of alumina. This processing, designated the "slurry solution" process, is described by Weiner in "RESEARCH ON ELECTRODES AND ELECTROLYTE FOR THE FORD SODIUM-SULFUR BATTERY," National Science Foundation, NSF C805, semi-annual report for 6/30/74-12/31/74, January 1975. As described in this publication, alpha alumina was slurried in concentrated solutions of lithium and sodium nitrates. The slurries were spray dried, producing powders for subsequent calcination. Calcined powder was pressed isostatically at 55 Kpsi and sintered at 1620° C. for 30 minutes, yielding products of 96.7% density. Difficulties were experienced in producing stable slurries amenable to spray drying. Insofar as described, the slurries contained about 37% total solids on a weight basis or about 31% alumina solids. Various suspending agents were used in unsuccessful attempts to overcome the instability of the spray dryer feed slurries but the need for further study was suggested by the author.

In a subsequent development, described in U.S. Pat. No. 4,052,538 to Eddy et al, colloidal alpha-alumina monohydrate was utilized as the source of alumina in a process for producing beta alumina ceramics which featured a spray drying operation. In accordance with the teachings of Eddy et al, a sintered sodium beta alumina article was made by forming an aqueous acidic colloidal solution (sol) of dispersible alpha-alumina monohydrate. An aqueous solution of an oxygen-containing sodium salt and, optionally, a salt of lithium or magnesium, was added to the colloidal solution to form a thixotropic gel which was spray dried to form a free-flowing powder. The powder was pressed, heated to remove volatiles and sintered to form the desired densified beta alumina article. In accordance with one embodiment of the invention, the spray dried powder was calcined and the calcined powder was pressed and sintered. In a preferred embodiment, the powder was pressed before the calcination treatment. As described in the patent, the uncalcined spray dried powder was pressed at $\geq 25$ Kpsi and the pressed body was slowly heated at about 100° C. per hour to decompose the raw materials and drive off the volatile matter. The article was then sintered at elevated temperature into dense polycrystalline beta alumina. This preferred embodiment represents somewhat of a departure from the prior art since the article was pressed before the precursor powder was calcined and converted to beta alumina. Analysis of the technology, including the preferred embodiment, suggests that it is wasteful of energy because considerable water must be evaporated from the spray dryer feed to produce the desired precursor powder. For example, in the case of the 15% solids slurry of alpha alumina monohydrate described in the illustrative examples of the patent, 85 tons of water would have to be evaporated from 100 tons of spray dryer feed slurry. After volatiles are driven off this would yield only 11 tons of beta alumina. Furthermore, from information provided in the patent to Eddy et al, it can be calculated that the spray dried beta alumina precursor powders would have a relatively low bulk density; i.e., a bulk density that is only 23% of the theoretical for beta alumina. A high compaction ratio would be required to press such a low bulk density powder into a structure having desired high density and this could entrap air in the structure during pressing. Entrapped air can crack the article upon decompression. Beta alumina precursor powders produced by the preferred embodiment of the process will press to low green density values, calculated to be less than 40% of theoretical. Those skilled in ceramics technology will appreciate the fact that low green density results in high shrinkage and, usually, introduces a great potential for cracking and poor dimensional control during firing. Another drawback or limitation to a process such as that of Eddy et al in which the precursor contains hydrated alumina is that a large amount of volatile matter is evolved during heating. This requires that the initial heating rate by low (100° C. per hour until the bodies reach 800° C.) Consequently the production rate would be less than rates achievable if large amounts of volatiles did not need to be eliminated during firing.

A general object of the invention is to provide an economical method of producing a high bulk density beta alumina precursor which possesses superior unfired properties including exceptional green strength and which yields high density polycrystalline beta alumina, preferably beta" alumina, membranes after firing.

THE INVENTION

Briefly stated, in accordance with this invention an anhydrous alumina powder that does not rehydrate in the presence of water, preferably alpha alumina, is formed into a high solids slurry in water containing one or more soluble compounds which yield $Na_2O$ when heated in air, and optionally containing one or more soluble compounds that will yield $Li_2O$, $MgO$ or a mixture thereof when heated in air. The slurry is rapidly dried, preferably by spray drying, to precipitate the sources of $Na_2O$ and optionally $Li_2O$ and $MgO$ and form a free flowing, dense beta alumina precursor powder comprising an intimate homogeneous mixture of anhydrous alumina, the sodium compound(s), and optionally lithium and magnesium compounds, in the form of small granules (microspheres). The resulting microspheres are then pressed into a shaped article of desired configuration, such as a tube or disc, in which the added metal compound(s) serves as the binding agent. The shaped article is heated to decompose and react the constituents of the precursor to form the desired beta alumina phase and the article is then sintered to produce a dense polycrystalline beta alumina.

In a preferred embodiment of the invention, alpha alumina powder is formed into a high solids fluid slurry in water containing sodium nitrate and sodium carbonate in preselected amounts and proportions and optionally but preferably containing one or more soluble compounds that will yield $Li_2O$, $MgO$ or a mixture thereof when heated in air. The slurry contains at least 40% solids, preferably at least 45% solids and most preferably at least 55% solids and is preferably free from organic binder material. The slurry is spray dried to precipitate the salts and form a free flowing dense beta alumina precursor powder comprising an intimate homogeneous mixture. The microspheres are pressed, preferably using a pressure below 40 Kpsi, and most preferably a pressure below 20 Kpsi, into a shaped article. The shaped article is heated to decompose and react the constituents and then sintered.

Pursuant to the especially preferred embodiment of the invention, the spray dryer feed is formulated by introducing the components into the slurry water in order to decreasing solubility. Thus, in practicing an especially preferred embodiment of the invention, the slurry is formulated by dissolving nitrate salt(s), for example lithium nitrate and sodium nitrate, and then incorporating sodium carbonate with agitation. Powdered alpha alumina is then added. The slurry, preferably containing 55% solids or above and free from organic binder, is wet milled and then spray dried to form the beta alumina precursor powder.

In practice of this invention, the firing schedule includes a presoak at a temperature in the range of between about 1000° C. and 1500° C. for several hours (for example, an isothermal presoak at about 1250° C., for about two hours) prior to sintering. Furthermore, it is especially preferred to employ a fast heating rate during firing prior to the presoak; for example, about 40° C. per minute.

It is noted that an essential feature of the invention resides in rapidly drying a slurry including powdered anhydrous alumina and water-soluble metal salts. This is necessary to avoid segregation of the salts during drying and assure the formation of a uniform and free-flowing powder that has a high bulk density. The spray dried granules can be deformed during pressing the produce green ware exhibiting outstanding green strength, provided a suitable preselected combination of salts have been incorporated in the slurry. Fired ware, such as discs and tubes, may exhibit remarkably homogeneous microstructure and this will be reflected in improved mechanical properties, flexural strength in particular.

Practice of the invention results in the initial preparation of a homogeneous high bulk density beta alumina precursor powder without need to use an expensive calcining step such as is required in carrying out most prior art technology. The precursor is obtained with a minimum of expensive milling steps and this minimizes the problem of contamination normally associated with the milling of calcined powders. In practice of the process of the invention a single rapid drying step is used with a high solids slurry to produce the precursor powder. In contrast, prior art technology that involves spray drying a slurry containing anhydrous alumina requires two or more drying steps. The process of the invention also obviates the need to use expensive organic processing aids that would eventually be destroyed during subsequent processing.

A unique and valuable feature of the invention is that the beta alumina precursor is produced as a powder of unusually high bulk density, considerably higher than the density of prior art precursor powders. Consequently the powders can be formed into unfired articles of high density, greater than 55%, at pressures as low as 5 Kpsi without organic pressing aids such as binders and lubricants. Because the anhydrous alumina-based beta alumina precursor powders have a lower volatile content, as compared to powders produced with the prior art hydrated colloidal alumina, there is less potential for structural damage due to decomposition of raw material when the powders are pressed and then heat treated. Therefore the heat treatment schedule using beta alumina precursor powders of the invention may be and is preferably accelerated as compared to those that would be necessary when using hydrated alumina.

Another valuable features of the invention is that alpha alumina is the major component of the uncalcined precursor powders. It is known in the art that when alpha alumina is pressed into a shape the crystals are randomly oriented. Therefore, when they react to form beta alumina, the beta alumina crystals are randomly oriented. Prior art calcined precursor powders are known to develop an unfavorable crystallographic orientation during pressing, and this causes increased ionic resistivity.

By way of summary, advantages of the process of the invention include: improved green density; exceptionally high green strength; reduced pressing costs relative to current state of the art processes; not tendency to develop unfavorable crystallographic orientation; easy adaptation to transient liquid phase sintering (since a fine salt phase is included in the green ware along with relatively coarse alumina); and conventional ceramic equipment may be used in the processing. Furthermore, practice of the invention provides a simple inexpensive method for achieving uniform distribution of raw material since all of the lithium and/or magnesium salts, and most of the sodium salt, is initially dissolved in the slurry vehicle and is subsequently precipitated uniformly (i.e., dispersed) among the anhydrous alumina grains in the microspheres produced by spray drying.

Other features and advantages of the invention will be apparent from the description of preferred embodiments and the illustrative examples.

DESCRIPTION OF PREFERRED EMBODIMENTS

Practice of the invention may be described with reference to five steps; namely, raw material selection; preparation of a slurry of insoluble powder in an aqueous solution of preselected salts, preferably a plurality of salts; spray drying to produce a substantially homogeneous beta alumina precursor powder; formation of the powder into the desired article, preferably by compaction under high pressure; and finally, heat treatment to decompose reactant precursors, eliminate volatiles, react the oxides in the decomposed mix to form the desired beta alumina crystalline phase and sinter (or coalesce) the individual grains of powder into a dense article consisting of a multiplicity of individual crystals.

Raw Material Selection

High purity commercial anhydrous alpha alumina powders with median particle sizes of 0.3 to about 5 microns have been used to produce high density beta alumina precursor powders. These aluminas had been produced by calcining hydrated aluminas obtained by the Bayer process. Alpha alumina is preferred to gamma alumina because alpha alumina has a higher true density (3.97 g./cc. vs. about 3.2 g./cc.), and can be formed into high solids slurries having rheological characteristics suitable for handling in conventional spray dryers and pumps. Present experience indicates that for spray drying, relatively coarse alumina powders (for example ALCOA A-14 alpha alumina which has a median particle size of 2 to 5 microns) are preferable to extremely fine aluminas (for example ALCOA A-16 alpha alumina which has a median particle size of $<1.0$ micron). The relatively coarse alumina powder is more readily formed into high solids slurries having rheological characteristics suitable for handling in conventional spray dryers and pumps. However, fine alpha alumina has yielded beta alumina precursor powders which have sintered to higher density than those produced from coarse alpha alumina.

The quantity of sodium salt(s) that are used in forming the slurry is that which will produce the molar ratio of $Al_2O_3/Na_2O$ in the range of about 5 to 11 with the powdered anhydrous alumina. Optional lithium and magnesium salts can be used in suitable amounts to yield from 0 to 1.5 weight percent $Li_2O$ and 0 to 2.5 weight percent MgO in the finished electrolyte.

The sodium compound(s) that is utilized preferably is one that contains oxygen in the anion. Use of such a salt avoids the need for reaction with atmospheric oxygen to form $Na_2O$ which reacts with the alumina to form beta alumina after spray drying. Examples of oxygen-containing salts are the carbonate, nitrate, sulfate and bicarbonate salts of sodium. Preliminary experimental tests indicate that sodium chloride may not react with alpha alumina to form beta alumina during heat treatment in air. Furthermore, the initial tests indicate that the chloride appeared to inhibit the reaction of alpha alumina with either of sodium carbonate or sodium nitrate during heat treatment. It is believed that sodium fluoride could be used in practice of the invention. When sodium nitrate was used as the sole source of $Na_2O$ in initial tests, the spray dried powder tended to pack together and would not flow. This problem was solved by utilizing a combination of sodium carbonate and sodium nitrate as the source of $Na_2O$. It is reasonable to expect, however, that sodium nitrate could be used as the sole source of $Na_2O$ with satisfactory results by variation in slurry composition.

As mentioned, it is preferable to employ a combination of sodium carbonate and sodium nitrate as the source of $Na_2O$. When utilizing this combination, the salts should be employed in a ratio of above 1 mole $Na_2CO_3$ to 2 moles $NaNO_3$. In other words, it is preferable to use more than 1 mole $Na_2CO_3$ per 2 moles $NaNO_3$ as the source of $Na_2O$. Especially preferred is the use of about 3 moles $Na_2CO_3$ per 2 moles $NaNO_3$. When present in sufficient proportion, relative to sodium nitrate, sodium carbonate improves the flow of the spray dried precursor particles, and it leads to the production of pressed articles having maximum green density.

Based on the assumption that (1) at least part of the sodium carbonate, when has a relatively low solubility, remains undissolved in the high solids spray dryer feed while all of the sodium nitrate (and optional magnesium and/or lithium salts) are in solution; and (2) that only dissolved salt acts as a binder for the pressed articles, the following would offer a reasonable explanation for the markedly superior results achieved when a combination of sodium carbonate and sodium nitrate is used as the source of $Na_2O$. It is believed that a density maximum is reached when there is an optimum amount of dissolved material in the spray drying solution. The density maximum is believed to be the result of two competing mechanisms, one that tends to increase the density of spray dried microspheres and another that inhibits the compaction of these microspheres into dense unfired shapes. The first of the two mechanisms predicts that the density of the microspheres should increase linearly when the amount of salt in solution is increased. The bulk volume of a conventional, salt-free, spray-dried microsphere is determined by the amount of powder in a given drop of slurry, and by how compactly the powder packs together when the drop dries. Its density is then the weight of powder in the microsphere divided by its bulk volume. When soluble salt is added to the slurry, it is believed that during rapid drying the soluble material is deposited in what would have been empty space between insoluble grains in a microsphere (without increasing the bulk volume of the microsphere significantly until the amount of soluble material is large compared to the available void volume in a microsphere). Since the weight of the microsphere is increased by the weight of the salt, and since its bulk volume is unchanged, the density (weight/volume) of a microsphere is linearly increased by the presence of more soluble material in the slurry solution from which it is spray dried. Therefore, all things equal, more solubles should increase the green density of pressed articles. However, a second phenomenon is believed to limit the density increase that can be realized by dissolving additional material in the slurry solution. This second mechanism predicts that the unfired density of articles pressed from the spray dried powders should decrease when the amount of dissolved material in the slurry solution is increased above a certain threshold level. When dissolved material is deposited between insoluble grains of a microsphere during spray drying, it "cements" the grains together and increases the strength of each microsphere. When the strength of a microsphere exceeds the stresses applied to it during pressing, the microsphere does not crush and compact. As more water-soluble binder is added to the powder, greater numbers of microspheres remain uncompacted after pressing, and the green density of shapes produced from such powders is lower than might be expected (based upon the individual microsphere density). By use of a combination of salts including at least one that is soluble, for example sodium nitrate, and one such as sodium carbonate that has limited solubility, a balance between the aforementioned competing mechanisms is achieved and maximum green density is realized.

Experimental tests reveal that green density is increased to a maximum as the proportion of soluble material to alumina and undissolved salt increases. At maximum green density the microspheres possess an optimum combination of: (1) high bulk density, and (2) sufficiently low strength to crush during pressing. With increased solubility of the raw material salts (i.e., more soluble "binder") the microsphere strength is increased until it exceeds the stresses applied during pressing and a significant number of microspheres remain uncrushed. Therefore green density decreases (despite an increase in microsphere bulk density) because the microspheres do not compact.

Based upon these hypothetical mechanisms, the green density of ceramics of the invention has been maximized by varying the ratio of two or more sodium salts with different solubilities.

The initial slurry that contains powdered anhydrous alumina may optionally (but preferably) include one or more water-soluble salts of magnesium and/or lithium (the oxides of which are known to stabilize the beta" crystalline form of beta alumina). Again it is preferable that these be oxygen-containing salts in order to avoid the need for a reaction with atmospheric oxygen to form magnesium and/or lithium oxides. It is also preferable that the magnesium and/or lithium salts be the most soluble species to insure that it (they) remain homogeneously distributed in solution until the drying operation. Lithium nitrate is an example of a preferred optional stabilizing salt.

Slurry Preparation

The raw materials are formed into a homogeneous slurry that is preferably as concentrated as can be obtained while still resulting in a fluid pumpable system. Generally the slurry should have a viscosity that is low enough to be spray dried, preferably lower than 20,000 cps.

In practice of the invention, controlled amounts of powdered alumina, sodium salt(s) and optionally magnesium and/or lithium salts are added to the water used to make up the slurry. Preferably these materials are added to a predetermined quantity of water in order of decreasing solubility. In other words, the most soluble compound, for example sodium nitrate, is added first and powdered alumina is incorporated last. This is necessary in order to assure complete dissolution of the highly soluble salts.

Sufficient water is added to form a slurry that contains at least 40% total solids, most preferably at least 55% solids. Solids are computed as follows:

$$\% \text{ Solids} = \frac{\text{wt. alumina} + \text{wt. salts}}{\text{wt. water} + \text{wt. alumina} + \text{wt. salts}}$$

The resulting slurry is mixed or milled for a suitable time, for example ½ to 12 hours, to assure solution of the salts, maximum dispersion of the alumina and, if necessary, comminution of the alumina. Milling time will vary inter alia with the equipment that is used, particle size of the alumina and solids content. Equipment suitable for the mixing or milling may include high purity alpha or beta alumina grinding media. Any of a variety of mills may be employed. Preferably high purity alpha alumina jars, polyethylene jars or polyurethane-lined metal jars are employed.

Powder Preparation

As mentioned hereinabove, the slurry is preferably dried in a spray dryer. A conventional spray dryer, for example a gas-fired dryer using centrifugal atomization, can be used. Excellent results have been achieved with a Nichols-Niro dryer fed by a peristatic pump and operated with air inlet temperature in the range of 290° to 330° C., air outlet temperature of 125° to 150° C. and atomizer air pressure of 4.5 to 5.0 Kg./cm.$^2$. The spray dried powder typically consists of microspheres in the size range of 5 to 35 microns.

Forming

Cylindrical closed end tubes may be formed by pouring spray dried powder into a tube mold of the type described by Eddy et al (U.S. Pat. No. 4,052,538) while the mold is vibrated, sealing the mold with an end cap, placing the sealed mold into a perforated metal sleeve in the compression chamber of an isostatic press, and pressing it under hydrostatic pressure of from 5 Kpsi to 40 Kpsi.

Other known means for forming techniques can be used. For example, cylindrical specimens, typically 1 inch diameter by 0.125 inch high, can be pressed from the powder by using a hardened steel die and a hydraulic press in a manner that is conventional in the art.

Using conventional pressing, the powder is pressed at from 5 to 40 Kpsi, preferably below 20 Kpsi and most preferably below 10 Kpsi, resulting in exceptionally high green densities of from 1.92 g./cc. to 2.44 g./cc.

$$\text{Green density} = \frac{\text{wt. pressed article } X \text{ (1-LOI)}}{\text{volume of pressed article}}$$

These values correspond, respectively, to 59% and 75% of the theoretical density (3.26 g./cc.) for beta alumina.

Heat Treatment

One recommended procedure is to place the pressed green article (on a thin layer of the powder from which they were pressed and formed) between two sheets of platinum foil. This technique is well known in the art. The assembly is placed in an electric furnace and heated to decompose the salts, react the raw materials to form the desired beta $Al_2O_3$ crystal phase and sinter the powders into a dense polycrystalline shape. Other firing techniques well known in the art can be employed.

Preferably the heating schedule is from room temperature to from 800° to 1500° C. at from 5° to 80° C. per minute, maintaining (presoaking) at temperatures in the range of from 800° to 1500° C., for several hours, for example from ½ to 8 hours, heating to from 1550° to 1650° C. at from 6° to 80° C. per minute, holding at from 1550° to 1650° C. for from 5 to 60 minutes, optionally cooling to a temperture at least 50° C. below the firing temperature, holding at this temperature for from ½ to 8 hours, and cooling to room temperature. Excellent results were obtained when shapes were heated from room temperature to from 1100° to 1400° C. at 5.2° C. per minute, held for from 1 to 4 hours at 1100° to 1400° C., heated to 1620° C. at 6.2° C. per minute, held at 1620° C. for 10 minutes, cooled to 1475° C. held at 1475° C. for 2 hours, and cooled to room temperature. The best results have been achieved when shapes were heated from room temperature to 1250° C. at 41° C. per minute, held at 1250° C. for 2 hours, heated to 1620° C. at 6.2° C. per minute, held at 1620° C. for 10 minutes, cooled to 1475° C., held at 1475° C. for 2 hours, and cooled to room temperature. However, the invention is not limited to the use of an isothermal presoak at 1250° C. since a firing schedule which keeps the article at temperatures between 800° C. and 1500° C., preferably between 1100° C. and 1400° C., for several hours, for example two hours, prior to sintering, may be substituted for such an isothermal presoak. Similarly, isothermal presoaks of four hours at either 1100° C. or 1400° C. can be used.

The following examples are given to illustrate further details of practice of the invention and to point out certain advantages. The invention is not to be construed as being limited to the specific reactants and reaction conditions used in these examples.

In these examples quantities are reported on a weight basis unless otherwise indicated.

EXAMPLE I

This example illustrates a preferred form of the invention in which a combination of sodium nitrate and sodium carbonate is incorporated into a high solids (70%) slurry of alpha-alumina (ALCOA A-14) which is then spray dried and pressed under relatively low pressure to form green beta alumina precursor bodies of high green density. Further illustrated are advantages over using the mixture of sodium nitrate and sodium carbonate instead of sodium nitrate alone.

A one-gallon polyethylene jar was filled to one-quarter its height with 1-inch diameter alumina balls (99.5% purity) as a grinding/dispersion medium. To this the following were added in the order indicated: 313 ml. distilled water, 0.3 cc. Darvan 7 ® dispersant, 51.2 g. $LiNO_3$, 171 g. $NaNO_3$, 104.6 g. $Na_2CO_3$, 1250 g. ALCOA A-14 alpha alumina, 62 ml. distilled water and 2.4 cc. Darvan 7. Additional high purity alumina balls were added to raise the level of the balls even to that of the liquid. The jar was sealed and rolled about its horizontal axis for 8 hours at 50 r.p.m. to mill the ingredients. The atomizer was driven by 4.5 kg./cm.$^2$ of compressed air. Inlet temperature of the spray dryer was 310° to 325° C. and outlet temperature was 125° to 145° C.

The resulting power was free flowing. One inch diameter discs were pressed at: 5, 10, 20 and 30 Kpsi using a hydraulic press. The average green density (samples), corrected for L.O.I. (loss on ignition) are given in Table I for each pressure.

TABLE I
EFFECT OF PRESSURE ON GREEN DENSITY OF BODIES PREPARED FROM SPRAY DRIED ALUMINA (A14) SLURRY CONTAINING $NaNO_3$—$Na_2CO_3$ BINDER

| Pressure, Kpsi | 5 | 10 | 20 | 30 |
|---|---|---|---|---|
| Green density, g./cc. | 1.98 | 2.22 | 2.33 | 2.44 |

Data in Table I can be compared favorably with typical green density values in the range of 1.60 to 1.95 g./cc. at 40 Kpsi for typical beta alumina precursor powder prepared in accordance with the teachings of Miller et al (See "A PRE-PILOT PROCESS FOR THE FABRICATION OF POLYCRYSTALLINE B"-ALUMINA ELECTROLYTE TUBING," Basic Science & Nuclear Divisions of The American Ceramic Society Preprint, Sept. 25–28, 1978, Hyannis, Mass.) and 1.23 g./cc. at 25 Kpsi for powders produced in accordance with U.S. Pat. No. 4,053,538 to Eddy et al. For example, at 10 Kpsi the green density was almost double that reported by Eddy et al for a pressure of 25 Kpsi. In effect, practice of the invention yielded a green density superior to the state of the art represented by the Miller et al technique at only ⅛ the pressure (5 Kpsi vs. 40 Kpsi).

Also shown by the example is that the slurry could be made at high solids (in excess of 70%) when A-14 was used, thereby minimizing energy wastage in the drying step.

The example was repeated substituting 342 g. $NaNO_3$ for the mixture of $NaNO_3$ and $NaCO_3$ and adding the $NaNO_3$ after addition of $LiNO_3$ and immediately before the alumina powder. It was found that the spray dried powder packed and would not flow. In contrast, the spray dried powder formulated with $NaNO_3$ and $NaCO_3$ was free flowing. This illustrates the advantage of incorporating $Na_2CO_3$ to improve flow.

While an organic dispersant (Darvan) was used in this example, subsequent experiments indicated that a dispersant was not needed to achieve a stable fluid high solids slurry capable of being spray dried.

EXAMPLE II

This example illustrates the use of a finer alumina (ALCOA A-16) in the process of the invention and demonstrates the desirable flow of the spray dried granules.

The procedure of Example I was repeated using a slurry formulated by adding the following ingredients in the order listed to a ½ gallon polyethylene jar containing 1000 g. of the 1-inch diameter high purity alumina balls: 365 ml. distilled water, 22.3 g. $LiNO_3$, 82.3 g. $NaNO_3$, 52.3 g. $Na_3CO_3$, and 625 g. ALCOA A-16 alpha alumina.

The jar with its contents was rolled for 8 hours at about 50 r.p.m. The slurry was diluted to 55% solids and then spray dried as in Example I. The resulting granules flowed through a funnel with a 14 mm. orifice compared to powders prepared by the method of Weiner et al which would not flow through the same orifice. The resultant granules also flowed through a 4½ mm. orifice. Reference is made to the following publication: "RESEARCH ON ELECTRODES & ELECTROLYTES FOR THE FORD SODIUM-SULFUR BATTERY," National Science Foundation, Contract #NSF-C805, Semiannual Report for 6/30/76–12/30/76. This indicates that the powder could be used to prepare beta alumina in the form of tubes using conventional forming technology and automatic powder handling equipment.

EXAMPLE III

The procedure of Example I was repeated using a slurry formulated by adding the following ingredients in the order listed to a ½ gallon polyethylene jar containing 1000 g. of the 1-inch diameter alumina balls: 452 ml. distilled water, 22.3 g. $LiNO_3$, 82.3 g. $NaNO_3$, 52.3 g. $Na_3CO_3$, and 625 g. ALCOA A-16 alpha alumina. The jar with its contents was rolled for 8 hours at about 50 r.p.m. and the slurry was spray dried.

Bars (nominally ¼"×⅜"×3") were pressed from a portion of the spray dried powder at 20 and 40 Kpsi. These were broken under three point loading over a 2" span at a deflection rate of 0.02" per minute. Green strength was 1300 p.s.i. for bars pressed at 20 Kpsi and 1420 p.s.i. for bars pressed at 40 Kpsi. In contrast, the state of the art technology reflected by Weiner et al resulted in a green strength of 380 p.s.i. for bars pressed at 40 Kpsi.

This example therefore illustrates the outstanding binding action of the mixture of salts and further demonstrates that practice of the process of the invention results in an unfired strength advantage as compared to the prior art.

Discs (nominally 1" diameter ×0.1" thick were pressed from the spray dried granules. The green density (corrected for L.O.I) was calculated for discs pressed at each pressure. Average green density of discs pressed at 5, 20 and 40 Kpsi are reported in Table II.

TABLE II
EFFECT OF PRESSURE ON GREEN DENSITY OF BODIES PREPARED FROM SPRAY DRIED ALUMINA (A-16) SLURRY CONTAINING $NaNO_3/Na_2CO_3$ BINDER

| Pressure, Kpsi | 5 | 20 | 40 |
|---|---|---|---|
| Green density, g./cc. | 2.15 | 2.20 | 2.36 |

Data in Table II show that discs prepared in accordance with the invention using A-16 alumina had high green density, superior to that achieved by the prior art technology (see Example I).

EXAMPLE IV

This example illustrates the desirability of a presoak during firing when practicing the process of the invention.

The procedure of Example I was repeated using a slurry formulated by adding the following ingredients in the order listed to a 1 liter beaker: 365 ml. distilled water, 22.3 g. $LiNO_3$, 82.3 g. $NaNO_3$, 52.3 g. $Na_3CO_3$, and 625 g. ALCOA A-16 alpha alumina. This was blunged for ½ hour, diluted to 55% solids, and spray dried as in Example I. Flow properties were generally similar to those realized in Example II.

Discs were pressed at 20 Kpsi from the spray dried granules obtained from the 55% solids slurry. The discs were fired without a presoak as follows:

Six discs were stacked in a platinum crucible alloyed with 10% rhodium. The discs were covered with a layer of granules obtained by spray drying the slurry. The crucible was then covered with a sheet of platinum. The assembly was heated from room temperature to 1500° C. at 7° C. per minute, from 1500° C. to 1605° C. at 3° C. per minute, held at 1605° C. for 20 minutes and cooled with the kiln. A disc was also packaged in powder of the precursor granules and Pt-Rh, as described above, and fired at about 7° C. per minute to 1500° C., held at 1500° C. for ½ hour and cooled with the kiln. The disc that was heated linearly to 1500° C. was flat and uncracked; however it was unsintered. The discs that were heated to 1605° C. were sintered, but they were also warped and cracked to varying degrees.

Two additional discs were given a presoak treatment as follows during the heating schedule. The discs were packaged as described above between precursor granules and platinum sheets and heated to 1020° C. at 5.2° C. per minute, held at 1020° C. for 16 hours, heated to 1620° C. at 6.2° C. per minute, held at 1620° C. for 10 minutes, cooled to 1475° C., held at 1475° C. for two hours and cooled with the kiln. Two more of the same discs were packaged and heated as described immediately hereabove, but they were held (presoaked) at 1250° C. for two hours rather than 1020° C. for 16 hours.

The discs held at 1020° C. were warped and cracked. In contrast, the discs held at 1250° C. were flat, uncracked and sintered. The use of the 1250° C. soak represents an obvious advantage over the heat schedule used in practice of the Eddy et al patent but a disadvantage over firing schedules useful in practice of other prior art technology which, however, does not secure the benefit of spray drying.

EXAMPLE V

This example illustrates the effect of varying the ratio of $Na_2CO_3/NaNO_3$ in the binder when preparing beta alumina bodies by the process of the invention.

Slurries A and B were formulated by adding the following ingredients to two one-gallon polyethylene jars in the order indicated and with stirring: 1398 ml. distilled water, 55.5 g. LiNO, 185.1 g. $NaNO_3$, 115.4 g. $Na_3CO_3$, 1353 g. ALCOA A-16. The mole ratio of $Na_2CO_3$ to $NaNO_3$ was 1:2 in A and B. The procedure was repeated to produce slurries C and D using 92.6 g. $NaNO_3$ and 173.1 g. $Na_2CO_3$; the mole ratio of $Na_2CO_3$ to $NaNO_3$ in slurries C and D was 3:2. High purity alumina grinding media (1" balls) were added to all slurries which were milled for 8 hours at about 50 r.p.m. and spray dried, as in Example I.

Discs were pressed from these powders at 10, 20 and 40 Kpsi. The discs were fired while sealed in platinum for 2 hours at 1250° C., 10 minutes at 1620° C. and 2 hours at 1475° C. The fired density of each disc was measured by immersion in isobutanol. By this technique a difference in density of 0.02 g./cc. is statistically significant.

The average results, reported in Table III, clearly demonstrate that powders C and D formulated with a 3:2 ratio of $Na_2CO_3$ to $NaNO_3$ fired to higher density (at equal pressing pressure) than powders A and B, which were identical except that the ratio of $Na_2CO_3$ to $NaNO_3$ was 1:2.

TABLE III

EFFECT OF RATIO OF $NaCO_3$ TO $NaNO_3$ ON FIRED DENSITY OF BETA ALUMINA CERAMICS

| Ratio (molar) $Na_2CO_3$ to $NaNO_3$ | Pressing Pressure, (p.s.i.) | | |
|---|---|---|---|
| | 10,000 | 20,000 | 40,000 |
| | Fired Density, g./cc. | | |
| 1:2 (A) | 2.94 | 3.01 | 3.07 |
| 1:2 (B) | 2.91 | 2.98 | 3.02 |
| 3:2 (C) | 3.03 | 3.07 | 3.11 |

TABLE III-continued

EFFECT OF RATIO OF $NaCO_3$ TO $NaNO_3$ ON FIRED DENSITY OF BETA ALUMINA CERAMICS

| Ratio (molar) $Na_2CO_3$ to $NaNO_3$ | Pressing Pressure, (p.s.i.) | | |
|---|---|---|---|
| | 10,000 | 20,000 | 40,000 |
| | Fired Density, g./cc. | | |
| 3:2 (D) | 3.00 | 3.06 | 3.10 |

EXAMPLE VI

This example shows that ceramics of the invention can be fired using very rapid heating rates (in the example about 40° C. per minute) without bursting or cracking and that when the initial heating rate is increased from about 5° C. per minute to 40° C. per minute, fired density is increased.

Six discs of powder from slurry C, Example IV, with a 3:2 ratio of $Na_2CO_3$ were used in the test. Two discs were pressed at 10 Kpsi; two pressed at 20 Kpsi and two pressed at 40 Kpsi. All were sealed in platinum and heated from room temperature to 1250° C. at 5.2° C. per minute, held at 1250° C. for two hours, heated from 1250° C. to 1620° C. at 37° C. per minute, held at 1620° C. for 10 minutes, cooled to 1475° C., held at 1475° C. for 2 hours, and cooled with the kiln. The above was then repeated with six identical discs (group B) at a different temperature schedule: room temperature to 1250° C. at 41° C. per minute, two hours at 1250° C., 1250° C. to 1620° C. at 6.2° C. per minute, 10 minutes at 1620° C., cooled to 1475° C., two hours at 1475° C. and cooled with the kiln.

All of the fired discs were sintered, flat and crack-free. Average densities are reported below in Table IV.

TABLE IV

EFFECT OF HEATING RATE ON FIRED DENSITY OF CERAMICS OF THE INVENTION

| Pressing pressure, Kpsi | Initial Heating Rate | |
|---|---|---|
| | Slow Heating (~5° C./minute) | Rapid Heating (~40° C./min.) |
| | Fired Density, g./cc. | |
| 10 | 2.95 | 3.07 |
| 20 | 3.03 | 3.12 |
| 40 | 3.05 | 3.16 |

EXAMPLE VII

Example V illustrated a preferred embodiment of the invention in which the spray dryer feed was formulated at about 55% solids with 1398 ml. water, 55.5 g. LiNO$_3$, 92.6 g. NaNO$_3$, 173.1 g. Na$_2$CO$_3$ (namely 3:2 molar ratio of Na$_2$CO$_3$:NaNO$_3$) and 1353 g. of ALCOA A-16 alpha alumina. Two of the discs were sealed in platinum and heated from room temperature to 1250° C. at 5.2° C. per minute, held at 1250° C. for two hours, heated from 1250° C. to 1620° C. at 6.2° C. per minute, held at 1620° C. for 30 minutes, cooled to 1475° C., held at 1475° C. for two hours, and cooled with the kiln. One disc was submitted for analysis by X-ray diffraction using copper K$\alpha$ radiation ($\lambda = 1.5418$ A). The fractional conversion to beta″ Al$_2$O$_3$ was calculated from the formula:

$$F(B'') = I_{34.4} / (I_{34.4} + I_{33.3})$$

where $I_{34.4}$ is the integrated intensity of the beta″ Al$_2$O$_3$ peak at 34.4° $2\theta$ and $I_{33.3}$ is the integrated intensity of the beta Al$_2$O$_3$ peak at 33.3° $2\theta$, and where the angle in degrees $2\theta$ is twice the diffraction angle from the Bragg equation: $n\lambda=2d\sin\theta$. The disc contained 96% beta" $Al_2O_3$.

From the preceding description of the invention it will be evident that the process has the potential to yield significant improvements in two areas critical to the production of cost-effective beta alumina membranes, namely processing costs and microstructural quality. Processing costs can be reduced by providing free-flow spray dried powders which can be automatically isostatically pressed at 5 to 30 Kpsi. Practice of the process of the invention can result in significant improvements in the quality and uniformity of the fired electrolytes by bringing about improvements in the green properties of the pressed ware, especially green strength and density. It is well known that many of the problems associated with the densification of ceramic materials can be traced to their green properties. In general a lower green density will require more sintering time or temperature to eliminate porosity. McGowan et al have shown (U.S. Pat. No. 3,895,963) that the maximum fired density of beta alumina ware increases with improved green density. In practice of my invention inorganic salts fill the pore structure of the green powder compact and the effective green density of the material can be increased significantly. Upon firing the salts decompose to the desired oxide, which becomes part of the ceramic structure. The soluble portion of the inorganic salts also function as binders which provide very high green strength, as demonstrated in the illustrative examples.

I claim:

1. A process for preparing a beta alumina article useful as a solid electrolyte which comprises (a) forming an aqueous substantially homogeneous slurry containing at least 40% solids on a weight basis and comprising powdered anhydrous alumina, sodium nitrate and sodium carbonate in predetermined relative proportions selected to produce in step (c) pressed green bodies having maximum green density, and, optionally, a source of cations selected from the group consisting of magnesium, lithium and mixtures thereof, (b) drying said slurry sufficiently rapidly to precipitate said soluble components and form a uniform particulate mixture thereof with said powdered alumina, (c) compacting said particulate mixture under pressure without having previously calcined it to produce a green shaped article having a green density in the range of about 1.92 to 2.44 g./cc., (d) heat treating said article to decompose and react the constituents of said particulate mixture to form beta alumina and sintering the article to produce dense beta alumina.

2. The process of claim 1 wherein said slurry is dried by spray drying.

3. The process of claim 1 wherein said slurry contains at least 55% solids on a weight basis.

4. A process for preparing a beta alumina article useful as a solid electrolyte which comprises (a) forming an aqueous substantially homogeneous fluid slurry consisting essentially of powdered alpha alumina, sodium nitrate and sodium carbonate in predetermined relative proportions selected to produce in step (c) a pressed green article having maximum green density, a source of cations selected from the group consisting of magnesium, lithium and mixtures thereof, said slurry containing at least 40% solids on a weight basis, (b) spray drying said slurry to form microspheres, (c) compacting said microspheres under pressure without having previously calcined the microspheres to produce a green shaped article having a green density in the range of about 1.92 to 2.44 g/cc., (d) heat treating said article to decompose and react the constituents of the microspheres to form beta alumina and sintering said article to produce dense beta alumina.

5. A process for preparing a beta alumina article useful as a solid electrolyte which comprises forming an aqueous substantially homogeneous slurry of powdered alpha alumina, sodium nitrate, sodium carbonate and, optionally, a soluble source of cations selected from the group consisting of magnesium, lithium and mixtures thereof, the molar ratio sodium carbonate to sodium nitrate being at least 1:2, said slurry containing at least 40% total solids on a weight basis, spray drying said slurry to form microspheres, compacting said microspheres under pressure in the range of 5 to 40 Kpsi without having previously calcined them to produce a green shaped article having a density in the range of about 1.92 to 2.44 g./cc., heat treating said article to decompose and react the constituents of the microspheres to form beta alumina and sintering said article to produce dense beta alumina.

6. The process of claim 5 wherein said slurry contains at least 55% solids on a weight basis.

7. The process of claim 6 wherein the molar ratio of sodium carbonate to sodium nitrate is is about 3:2.

8. The process of claim 5 wherein said slurry is formed by dissolving the optional salts and sodium nitrate in water, thereafter incorporating sodium carbonate and then adding said alpha alumina.

9. The process of claim 8 wherein said slurry contains in excess of 50% solids on a weight basis.

10. The process of claim 5 wherein said microspheres are compacted by isostatic pressing.

11. The process of claim 5 wherein said green article is in the form of a tube.

12. A process for preparing a beta alumina article useful as a solid electrolyte which comprises (a) dissolving sodium nitrate in water, also dissolving at least one salt selected from the group consisting of magnesium nitrate and lithium nitrate, thereafter adding sodium carbonate and then adding powdered alpha alumina having a median particle size in the range of about ¼ to 3 microns, said slurry containing at least 50% total solids on a weight basis and having an $Al_2O_3/Na_2O$ molar ratio in the range of about 5 to 11, the mole ratio of sodium carbonate to sodium nitrate being in the range of about 3:2 to 1:2, (b) milling said slurry, (c) spray drying said slurry at a temperature insufficient to decompose said sodium nitrate and sodium carbonate to produce microspheres comprising alumina powder uniformly mixed with sodium nitrate, sodium carbonate and, optionally, other salt, (d) compacting said microspheres by isostatic pressing under a pressure in the range of 5 to 40 Kpsi without previously calcining said microspheres to form a shaped green article having a density in the range of about 1.92 to 2.44 g./cc., (e) heat treating said article to decompose and react the constituents of the microspheres to form beta alumina, said heat treatment including a presoak at a temperature in the range of 800° to 1500° C. and (f) sintering said article to produce dense polycrystalline beta" alumina.

13. The process of claim 12 wherein said green article is heated from room temperature to a temperature in the range of 800° to 1500° C. at a rate in the range of from 5° to 80° C. per minute, held at temperatures in the range of 800° to 1500° C. for from ¼ to 8 hours, heated to a temperature in the range of from 1550° to 1650° C.

at a rate of from 6° to 80° C. per minute, held at said temperature in the range of from 1550° to 1650° C. for from 5 to 60 minutes, optionally cooled to a temperature at least 50° C. below said temperature in the range of 1550° to 1650° C. held at said temperature for form ½ to 8 hours, and then cooled to room temperature.

14. A process for preparing beta alumina precursor powder which comprises dissolving sodium nitrate in water, also dissolving at least one salt selected from the group consisting of magnesium nitrate and lithium nitrate, thereafter adding sodium carbonate and then adding powdered alpha alumina having a median particle size in the range of about ½ to 3 microns, said slurry containing at least 50% total solids on a weight basis and having an $Al_2O_3/Na_2O$ molar ratio in the range of about 5 to 11, the mole ratio of sodium carbonate to sodium nitrate being in the range of about 3:2 to 1:2, milling said slurry, and spray drying said slurry at a temperature insufficient to decompose said sodium nitrate and sodium carbonate and said other salt, thereby producing microspheres comprising a homogeneous mixture of the solid components of said slurry and having a green density in the range of about 1.92 to 2.44 g./cc. when pressed isostatically under pressure in the range of 5 to 40 Kpsi.

15. The process of claim 14 wherein the molar ratio of sodium carbonate to sodium nitrate is about 3/2.

16. The process of claim 13 wherein said slurry is formed by dissolving sodium nitrate and said optional source of cations in water, thereafter incorporating sodium carbonate and then adding said anhydrous alumina.

17. The process of claim 14 wherein said slurry contains at least 50% solids on a weight basis.

* * * * *

UNITED STATES PATENT AND TRADEMARK OFFICE
CERTIFICATE OF CORRECTION

PATENT NO. : 4,193,954
DATED : March 18, 1980
INVENTOR(S) : Barry K. Speronello

It is certified that error appears in the above-identified patent and that said Letters Patent are hereby corrected as shown below:

Column 2 - line 34 should read -- ever, are designed to operate at only $\leq$ 30 Kpsi and --.

Column 3 - line 66 should read -- ing. This requires that the initial heating rate be low --.

Column 5 - line 9 should read -- dried granules can be deformed during pressing to --; line 50 should read -- Another valuable feature of the invention is that --; line 63 should read -- to current state of the art processes; no tendency to --.

Signed and Sealed this

Seventeenth Day of June 1980

[SEAL]

Attest:

SIDNEY A. DIAMOND

*Attesting Officer*        *Commissioner of Patents and Trademarks*